June 13, 1961 H. TÖPFER ET AL 2,988,600

TELEPHONE CALL METERING

Filed May 20, 1955

Inventors.
Herbert Töpfer, &
Friedrich Pfleiderer.
By [signature] Atty.

2,988,600
TELEPHONE CALL METERING

Herbert Töpfer, Munich, and Friedrich Pfleiderer, Munich-Solln, Germany, assignors to Siemens & Halske Aktiengesellschaft, Munich and Berlin, Germany, a corporation of Germany Filed May 20, 1955, Ser. No. 509,998
In Germany July 25, 1949
Public Law 619, Aug. 23, 1954
Patent expires July 25, 1969
2 Claims. (Cl. 179—7.1)

Figures 1, 2, 3:
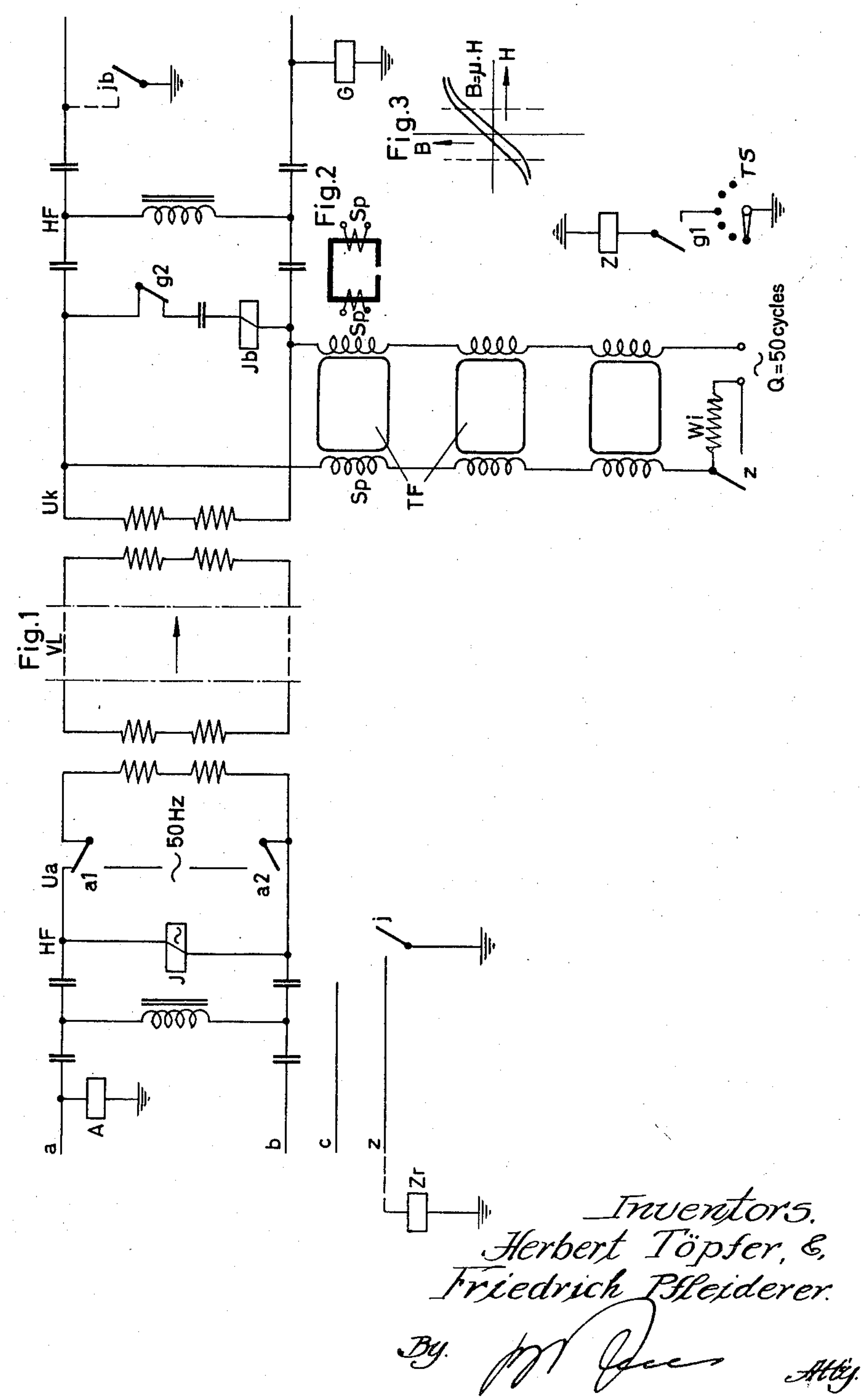

This invention relates to telephone call metering and is particularly concerned with a circuit arrangement for metering calls according to time and/or zone requirements.

The switching signals required for building up calls over two-conductor trunk lines are in the system assumed in connection with the invention transmitted with alternating current with a frequency, for example, of 50 cycles. The line conductors are during conversation between parties exclusively used for the talking currents, the transmission of the switching signals for effecting seizure of switching devices and number selection being effected prior to switching calls through, and signals for the release of connections and for the call metering being transmitted responsive to conclusion of calls.

If call metering is desired during the time calls are in progress, which results in considerable advantages so far as the expenditures for switching means for the call metering devices and the utilization of high-grade trunks are concerned, care must be taken to avoid disturbance of the talking parties by metering impulses transmitted over trunk lines.

Proposals have been made to use in such cases direct current impulsse for effecting the metering. However, the corresponding arrangements necessitate changes in the repeaters at the ends of trunk lines and connecting thereto direct current potentials, such changes making the advantage of repeaters questionable.

A further possibility is to transmit metering impulses with alternating current, simultaneously over the corresponding line conductors of trunk lines. Such transmission may be carried out without disturbing existing calls, but it prevents utilization of trunks in phantom circuits for a plurality of simultaneous connections.

The invention proposes to transmit over trunk lines alternating current metering impulses which are periodically effective in different time sequence according to zones involved, while a call is in progress, in the same manner as the alternating current impulses used for switching signals for the building up of the corresponding connection, and preferably with the same frequency, for example, 25 or 50 cycles.

In order to avoid disturbing existing calls over the corresponding trunk line, care must be taken in such surprisingly simple arrangement to prevent passage of the alternating current metering impulses in the direction of the exchange by the provision of high pass filters at the trunk line ends, and to clear the transmitted frequency of higher frequencies by the provision of a low pass filter at the transmission point, which is, in the assumed case, at the outgoing end of the trunk line.

The advantage of the arrangement according to the invention resides above all in the fact that the devices for the periodic metering need not be disposed in subexchanges but can be transferred to central exchanges of higher order. Since the number of subexchanges exceeds that of the central exchanges by several times, there will result a considerable reduction of costly switching devices such as timers and zone switches.

The foregoing and other objects and features will appear from the description rendered below with reference to the accompanying diagrammatic drawing, wherein FIG. 1 shows an embodiment of the invention, illustrating only the details required for an understanding thereof;

FIG. 2 indicates a choke coil used in the system of FIG. 1; and

FIG. 3 is a curve to explain the nature of the core material for the choke coil.

There is provided a two-conductor trunk line VL which is inductively blocked at each end by repeaters connected thereto. Over this trunk line are built up connections, automatically, in known manner, extending in the direction of the arrow, by transmitting alternating current switching signals using, for example, 50 cycles. The direct current switching signals for the building up of a connection are received by the impulse relay A in the incoming repeater *Ua* and such relay retransmits these signals at contacts *a*1 and *a*2 controlled thereby, as alternating current signals over the trunk line VL to the outgoing repeater *Uk*.

In the outgoing repeater *Uk*, such signals are received by the impulse relay *Jb* which retransmits them in usual manner, as ground impulses, over the upper trunk conductor, by actuation of contact *jb*, for the purpose of setting the successive switching devices. The transmission of alternating current switching signals and retransmission of corresponding direct current impulses is repeated until the connector is finally set with its wipers in engagement with the bank contacts of the called line.

When the called party answers, the relay G in the outgoing repeater *Uk* will be energized by an impulse transmitted from the connector (not shown). Upon energizing, relay G disconnects the impulse relay *Jb* by opening contact *g*2, and closes its contact *g*1 to start a timer TS which causes periodic energization of the relay Z. Relay Z connects at its contact *z* periodically alternating current, preferably 50 cycles, from the source $Q=50$, for transmission over the trunk line VL.

The metering impulses thus transmitted over the trunk line VL by way of repeaters *Uk* and *Ue* reach the meter control relay J in the incoming repeater *Ua*, and such relay retransmits these impulses at its contact *i* to the meter *Zr* of the calling party.

The connection of the alternating current metering impulses from the transmitting point to the trunk line is effected in the same manner as the connection of the alternating current signals for building up a call. The alternating current metering impulses accordingly flow in each case over the serially disposed windings of the repeaters.

In order to prevent passage of the alternating metering current pulses to exchange portions of the corresponding connection, there is a high pass filter HF provided in the repeater at each end of the trunk line VL. These high pass filters block the metering frequency but pass the speech frequencies. Moreover, in order to avoid disturbing an existing call by the metering frequency, there is provided a low pass filter TF between the current source $Q=50$ and the line conductors of the outgoing repeater U*k*, such low pass filter being effective to clear the transmitted frequency of higher frequencies, especially incident to switching operations. It is of decisive importance for this filter circuit that the core of the coil S*p* disposed nearest to the line conductors (talking circuit) is made of a material which exhibits a permeability that remains substantially constant over a predetermined range of the alternating current which affects the field strength thereof, examples of which are disclosed in publication entitled "Gecalloy Low Loss Cores Micropowder Magnets." Coils of this type are well known, for example, the so-called Pupin coils with the air gap as disclosed in German Patents Nos. 252,452—323,478—343,300—343,332 and 584,291. Such coils are also illustrated in German reference "Lehrbuch fuer Funkempfangstechnik," by H. Pitsch, copr. 1948 by Akademische Verlagsanstalt Geest & Portig K.-G., Leipzig, pages 64–65, Section $40_3$ "Einfluss des Luftspaltes bei Transformatoren und Drosseln," English translation of which may be found in the library, U.S. Patent Office. As brought out in the last-mentioned article, there is always an optimum air gap length, corresponding to the highest possible inductivity, above which optimum, or below which the magnetization curve becomes flatter. In the computation of the inductivity, the presence of an air gap results in the necessity of increasing the number of turns in order to compensate for the inductivity decrease due to the lower total permeability, and the iron cross-section must be decreased in order to prevent a decrease in the line density. In practice, the number of turns and the iron cross-section are increased, since larger numbers of windings generally must be mounted on a larger core. Consequently, the magnetization curve and thus the inductive impedance of the choke may be made relatively linear by proper dimensioning and corelation of the air gap, winding turns, core cross-section for optimum results. Nonlinear distortions and therewith higher frequencies are in this manner avoided in the output circuit of the filter; metering impulses reach the trunk line with a sufficiently pure sinusoidal curve form.

As shown in FIG. 2, the two windings of the choke coil are disposed upon a circular or rectangular core provided with an air gap.

FIG. 3 indicates the magnetization curve of the core of the choke coil, letter H indicating the electric field strength, B the magnetization induction and $\mu$ the permeability factor. The curve is in the range of the alternating current approximately linear; the saturation induction is not obtained at maximum operating current. Such curves may be obtained with various core material. Highly alloyed sheet material with low hysteresis and eddy current losses may be used. An air gap may be provided if desired so as to improve the linearity of the magnetization curve.

In order to exclude any disturbance of the call in progress, the transmitted metering frequency is furthermore connected to the line conductors of the repeater U*k* at the outgoing end of the trunk line over a resistor W*i* which is fixedly disposed in the corresponding transmitting circuit. The permanent presence of this high resistance resistor results in a low residual current flowing over the filter TF whereby switching surges are in much better way avoided than would be the case with complete disconnection of the metering current source from the trunk line. It should also be observed that the contact *z* connects the metering frequency not over break contacts disposed in the line conductors but in parallel to these conductors. This is likewise being done so as to avoid as much as possible disturbing noises in an existing call.

The meter control relay J in the incoming repeater U*a*, which receives the metering current impulses, is advantageously so constructed, for example, by the provision of air gaps between its core and armature, and selection of the magnetic core material similar to that for the chope coil S*p*, that the magnetic conductivity of the relay core suffers, incident to attraction of the armature responsive to the metering impulses, no changes that may disturb the existing call by current distortions caused thereby and in turn causing repercussions such as clicking noise in the talking circuit. A filter chain ahead of the corresponding relay may in this manner be dispensed with.

Changes may be made within the scope and spirit of the appended claims.

We claim:

1. In a telephone system having a two-conductor trunk line including a repeater connected thereto respectively at the incoming and at the outgoing end thereof, over which trunk line calls are extended from calling to called stations by transmitting thereover switching signals in the form of alternating current impulses of predetermined frequency, a device for metering a call extended over said trunk line, while such call is in progress, by periodically transmitting over said trunk line metering current in the form of alternating current impulses at a frequency corresponding to that of said switching signals, said device comprising an alternating current source for producing said metering current, choke coils forming a filter circuit connected to the repeater at the outgoing end of said trunk line, means including a high ohmic resistor for connecting said alternating current source to said filter circuit, said resistor normally causing a current flow of low magnitude from said current source over said filter circuit to said outgoing repeater, and means for periodically short-circuiting said resistor to transmit the alternating metering impulses to the outgoing repeater, for transmission thereof over said trunk line, said filter circuit being operative to filter from said metering current frequencies exceeding a rated frequency, one of said choke coils of said filter circuit which is disposed nearest to said outgoing repeater comprising a core made of a material having a permeability which remains substantially constant over a predetermined range of the operating alternating current affecting the field strength thereof.

2. A system and cooperation of parts according to claim 1, comprising a meter control relay disposed in the repeater connected to the incoming end of said trunk line, said meter control relay receiving the alternating current metering impulses transmitted over said trunk line and operatively responding thereto by attraction of its armature to effect operative actuation of a metering circuit for registering said impulses and thereby metering the corresponding call, said meter control relay comprising a core made of a magnetizable material the magnetic conductivity of which remains substantially unaltered responsive to attraction of the armature.

References Cited in the file of this patent

UNITED STATES PATENTS

| | | |
|---|---|---|
| 1,723,153 | Green | Aug. 6, 1929 |
| 1,834,393 | Fowler | Dec. 1, 1931 |
| 2,218,571 | Beale | Oct. 22, 1940 |
| 2,282,911 | Topfer et al. | May 12, 1942 |